(No Model.) 2 Sheets—Sheet 1.

P. WHITE.
WATER CLOSET.

No. 359,913. Patented Mar. 22, 1887.

Attest:
Charles Pickles
J. W. Hoke

Inventor:
Peter White
by C. D. Moody
atty (No Model.) 2 Sheets—Sheet 2.

P. WHITE.
WATER CLOSET.

No. 359,913. Patented Mar. 22, 1887.

Attest:
Charles Pickles
J. W. Hoke.

Inventor:
Peter White
by C. D. Moody
atty

UNITED STATES PATENT OFFICE.

PETER WHITE, OF ST. LOUIS, MISSOURI.

WATER-CLOSET.

SPECIFICATION forming part of Letters Patent No. 359,913, dated March 22, 1887.

Application filed December 9, 1885. Serial No. 185,194. (No model.)

*To all whom it may concern:*

Be it known that I, PETER WHITE, of St. Louis, Missouri, have made a new and useful Improvement in Water-Closets, of which the following is a full, clear, and exact description.

The improvement relates to that class of water-closets termed "tank-closets," and more especially to tank-closets in which a vacuum is produced within a chamber alongside the bowl, for the purpose of discharging the contents of the bowl by siphonic action; and it consists in the improved means for delivering the water to and from the tank and for producing the siphonic movement.

Figure 1:
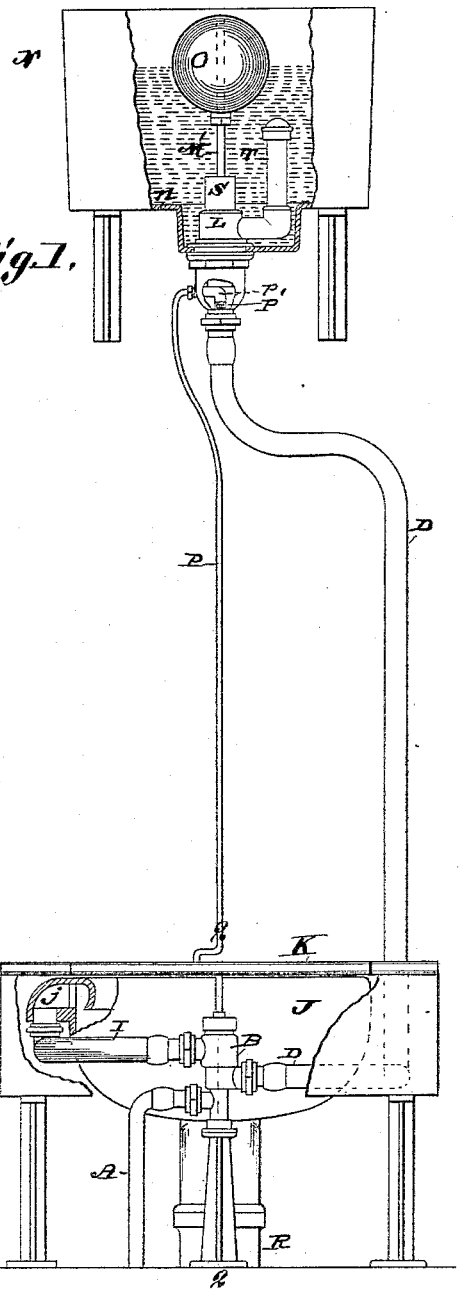
Figure 2:
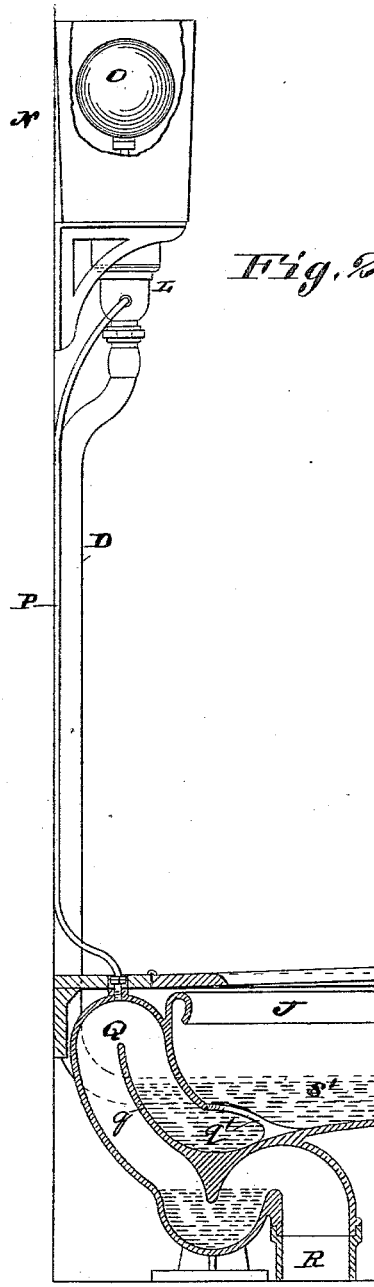
Figure 3:
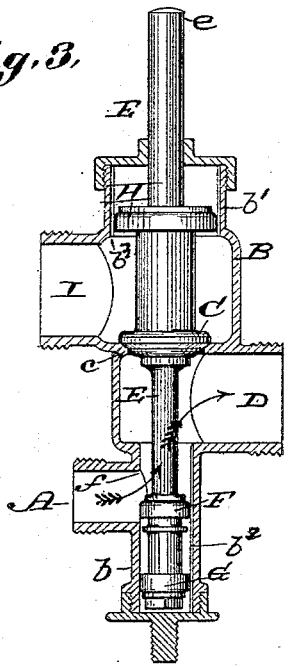
Figure 4:
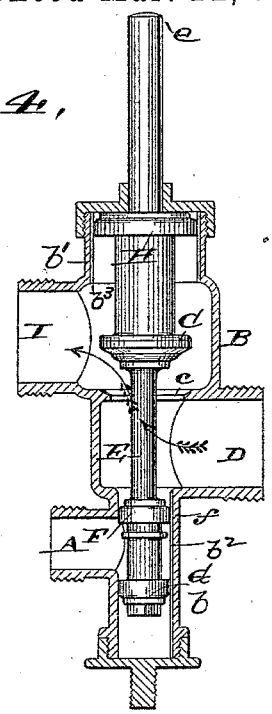
Figure 5:
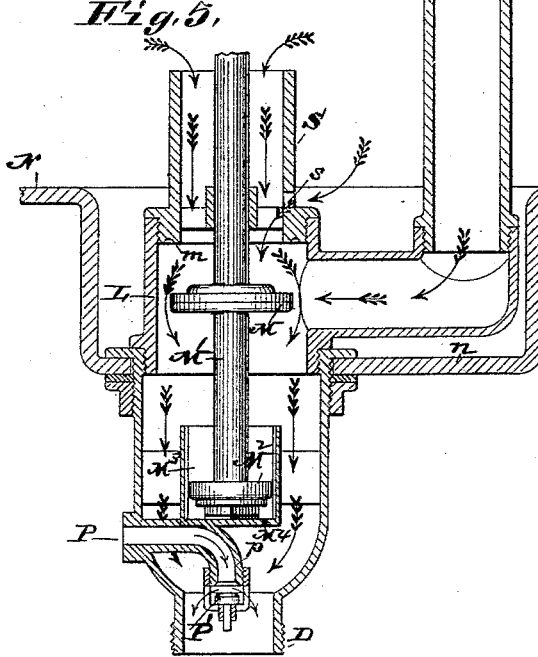
Figure 6:
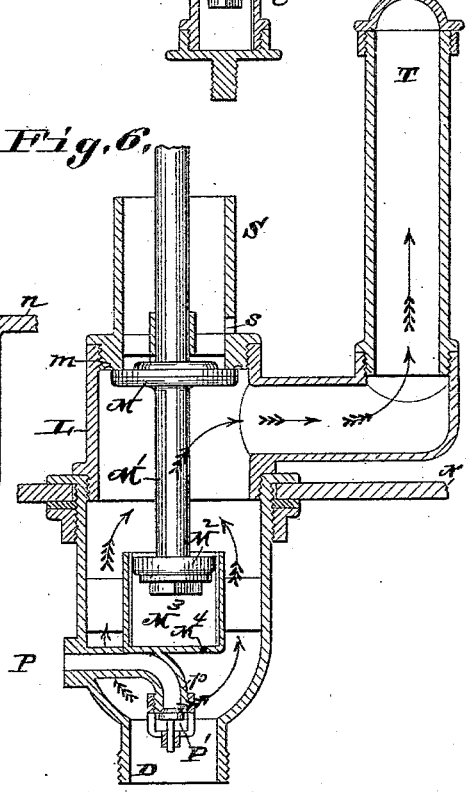

In the annexed drawings, making part of this specification and exhibiting a water-closet having the improvement, Figure 1 is a front elevation of the closet. Portions are broken away and in section to exhibit the interior construction. Fig. 2 is a view at right angles to that of Fig. 1, being partly in elevation and partly in vertical section on the line 2 2 of Fig. 1. The tank is partly broken away. Fig. 3 is a vertical section of the hopper-valve, the valve being as when the water is flowing to the tank. Fig. 4 is a view similar to that of Fig. 3, showing the valve as when the water is flowing from the tank to the hopper. Fig. 5 is a vertical section of the tank-valve, the valve being unseated, as when the water is being discharged from the tank into the hopper; and Fig. 6 is a view similar to that of Fig. 5, showing the valve seated.

The last four views are upon an enlarged scale.

The same letters of reference denote the same parts.

A represents the pipe through which the water is supplied from the main to the water-closet. The pipe delivers the water, as shown in Fig. 3, into the hopper-valve chamber B. When the hopper-valve C is seated, as in Fig. 3, the water flows through the chamber into the pipe D—that is, the hopper-valve stem E is provided with the valve F in addition to the valve C. The valve F seats at $f$ and the valve C seats at $c$, and when the valve C is seated the valve F is unseated, and, on the other hand, when the valve F is seated the valve C is unseated, as shown in Fig. 4. The hopper-valve chamber B is suitably shaped to provide for these movements, and to provide for operating the valves more easily, and so that they shall close gradually, the valve-chamber B is extended at $b$ and $b'$, and the stem E is furnished with the cup-leathers G H, which are adapted to work in the extensions $b\ b'$, respectively. The cup-leathers are respectively turned toward the valves F C, and the extensions $b\ b'$ are each grooved at $b^2\ b^3$, respectively, to enable the water beyond the cup-leather to pass it. The pipe I, Figs. 1, 3, 4, delivers the water from the hopper-valve chamber to the hopper J at $j$, Fig. 1. The hopper-valve stem E extends upward, and its upper end, $e$, encounters the closet-seat K, so that when the closet is being used and the free end $k$ of the seat depressed the stem E is moved downward, the valve C closed, and the valve F opened. The water is then, as stated, cut off from the hopper, but can and does flow through the chamber B and pipe D into the tank-valve chamber L, Figs. 1, 2, 5, 6. The water thence and past the tank-valve M flows into the tank N. The tank-valve stem M', at its upper end, is provided with a float, O, which, as the water wells upward in the tank, rises, and ultimately causes the tank-valve M to seat at $m$, as shown in Fig. 6. The water now ceases to flow into the tank, and as yet it does not flow to the hopper; but when the downward pressure upon the closet-seat is removed the main pressure acts to unseat the hopper-valve C and seat the valve F, as in Fig. 4. The seating of the valve F cuts off the main pressure, and, the tank-valve M being no longer upheld, the water is discharged from the tank downward through the pipe D, past the valve C into the pipe I, and thence into the hopper, as indicated by the arrows in Figs. 4, 5. The pipes D I are of sufficient size to permit of the water being delivered freely downward, as described.

P represents a pipe which leads from the chamber Q to the tank-valve chamber L, the pipe entering the chamber, and having its end $p$ so constructed, in connection with the chamber, as by turning the end $p$ downward therein, as shown, to cause the downward flow of water from the tank to draw the air from the pipe P, and hence create or tend to create a vacuum within the chamber Q. This chamber, substantially as shown in Fig. 2, is provided with the partition $q$, and is connected with the hopper at $q'$, and so that the entire construction is in effect a siphon. When the air is exhausted upward through the pipe P, the water within the closet rises into the upper part of the chamber Q and to above the partition $q$, whereupon by siphonic action the liquid contents of the hopper are drawn rapidly therefrom and discharged into the outlet R, Fig. 1. The vacuum is maintained within the pipe P during the flow of the water from the tank, or rather until the water is lowered to the top of the tubular partition S, through which the water leaves the tank. This partition rises to a limited distance above the bottom $n$ of the tank, and the tank being open at its top, the discharge ceases when the water-surface reaches the top of the partition, and as soon as it does cease and the vacuum is destroyed by reason of air entering the upper end of the pipe P the water ceases to be discharged from the hopper.

To enable the hopper to be refilled, so as to have water standing in it, the partition S is perforated at $s$, Figs. 5, 6. The remaining water in the tank flows slowly through this perforation, through the tank-valve chamber into the pipe D, and thence into the hopper, substantially as is represented at $s'$, Fig. 2, whereupon the hopper is in condition for another using.

Additional features of the construction remain to be noted. The air-pipe P is provided with a valve, P', Figs. 5, 6, which, as shown in Fig. 6, is adapted to seat and close the upper end of the pipe P during the upward flow of the water through the pipe D to the tank. This prevents the water from flowing into the air-pipe P. When the water flows from the tank, the valve P' unseats, as shown in Fig. 5.

T, Figs. 5, 6, represents an air-chamber leading out of the tank-valve chamber. Its function is partly to cushion the closing of the tank-valve, and partly, by reason of the air being compressed within the upper end of the air-chamber, to effect the rapid discharge of the water downward through the pipe D as soon as the tank-valve is opened, for the confined air in the air-chamber expands and operates to force the water downward. To prevent the tank-valve from closing too suddenly, the tank-valve stem M' is extended downward and furnished with a cup-leather, $M^2$, Figs. 5, 6, which is adapted to work in the chamber $M^3$ within the chamber L. The cup-leather $M^2$ is turned upward, and the tank-valve cannot seat, saving as the water leaks through the groove $m$ past the cup-leather $M^2$ and into the chamber $M^3$ beneath the cup-leather. There is a small opening, $M^4$, in the bottom of the chamber $M^3$, to enable the water beneath the cup-leather to drain out of the chamber $M^3$, and thereby prevent the cup-leather from being upheld by the water beneath it, and so as to keep the tank-valve from unseating. The air-pipe P at its upper end may connect with either the valve-chamber L or with the pipe D.

I claim—

1. The combination of the pipes A D I P, the valve-chambers B L, the valves C F M P', the valve-stems E M', the float O, the tank N, the hopper J, the chamber Q, and the seat K, substantially as described.

2. The combination of the valve-chamber L, the tank N, the valve M, the air-chamber T, and the pipe D, substantially as described.

3. In a tank water-closet in which a vacuum is produced within a chamber connected with the hopper for the purpose of discharging its contents by siphonic action, a pipe leading from said chamber and connecting with the pipe used to supply the water to and discharge it from the tank, said first-named pipe having a valve to prevent the water when going to the tank from entering that pipe, as described.

Witness my hand this 5th day of December, 1885.

PETER WHITE.

Witnesses:
C. D. MOODY,
J. W. HOKE.